United States Patent [19]

Furr et al.

[11] 4,083,340
[45] Apr. 11, 1978

[54] GASOLINE SUPERHEATER

[75] Inventors: Clen H. Furr, Belmont, W. Va.; Dan W. Favreau, McConnelsville, Ohio

[73] Assignee: Fuel Superheater Systems, Inc., McConnelsville, Ohio

[21] Appl. No.: 799,106

[22] Filed: May 20, 1977

Related U.S. Application Data

[63] Continuation-in-part of Ser. No. 596,951, Feb. 25, 1977, abandoned.

[51] Int. Cl.² ............................................. F02M 31/00
[52] U.S. Cl. ................................. 123/122 E; 123/133; 165/52; 261/144
[58] Field of Search ................. 123/133, 34 A, 122 E; 261/145, 144; 165/52

[56] References Cited

U.S. PATENT DOCUMENTS

| | | | |
|---|---|---|---|
| 916,003 | 3/1909 | Osborn | 123/122 E |
| 990,741 | 4/1911 | Jacobs | 123/122 E |
| 2,231,525 | 2/1941 | Breitling | 123/122 E |
| 2,390,979 | 12/1945 | Young | 123/122 E |
| 3,118,496 | 1/1964 | Vandenbosch | 165/52 |
| 3,354,872 | 11/1967 | Gratzmuller | 123/122 E |
| 3,699,938 | 10/1972 | Frazier | 123/122 E |

FOREIGN PATENT DOCUMENTS

| | | | |
|---|---|---|---|
| 209,774 | 11/1959 | Australia | 165/52 |
| 840,643 | 4/1939 | France | 123/133 E |
| 212,902 | 1/1925 | United Kingdom | 123/122 E |

Primary Examiner—Ronald H. Lazarus
Attorney, Agent, or Firm—Jerome R. Cox

[57] ABSTRACT

The superheater of the invention is provided for the purposes of improving the efficiency and cleanliness of gasoline internal combustion engines which are used extensively and which are the usual motive power of automobiles. The superheater includes a housing or chamber which may be assembled in communication with the fuel supply tank of an internal combustion engine. It includes means such as a connection with the engine cooling system for heating gasoline in the housing or chamber to a temperature above its normal boiling point while the gasoline is held in its liquid state under pressure. It also includes means for controlling the pressurized flow of the superheated gasoline to the fuel input of the engine. In the embodiment illustrated, a heating coil is provided in the chamber so that heated engine cooling fluid may pass through the housing or container and thus heat the gasoline without coming in actual contact with the gasoline. Also in this embodiment means are provided for conducting any excess flow resulting from the increased pressure in the housing or chamber through pressure reducing and cooling devices back to the fuel supply tank.

16 Claims, 2 Drawing Figures

GASOLINE SUPERHEATER

PRIOR APPLICATION

This application is a continuation-in-part of application for patent by the present inventors Ser. No. 596,951 filed 2/25/77 which is now abandoned.

BACKGROUND OF THE INVENTION

1. The Field

The device of this invention is directed to the heating of gasoline under pressure to a temperature higher than its normal boiling point while maintaining it liquid by means of the pressure. The purpose of this procedure is so that when the pressure is released as in the carburetor or the intake manifold apparently every particle of the gasoline becomes instantly gaseous and mixes thoroughly and evenly with the air rather than forming a mixture of gaseous gasoline, air and droplets of liquid gasoline as apparently often happens in present day automobile gasoline combustion.

2. Prior Art

Most authorities agree that the conversion of gasoline to energy in the present day automobile engine is not very efficient. Accordingly many inventors have attempted to obtain greater efficiencies in many ways. Some inventors have attempted to achieve such efficiency by applying heat to the gasoline on its way from the supply tank to the carburetor. Some of these inventions are disclosed in the patents included in the following list of patents which were found in a preliminary search regarding this invention.

| U.S. Pat. Nos. | | |
|---|---|---|
| 3,699,938 | 10/72 | Frazier |
| 3,253,647 | 5/66 | Deshaies |
| 3,354,872 | 11/67 | Gratzmuller |
| 1,300,600 | 4/19 | Giesler |
| 1,318,068 | 10/19 | Giesler |
| 1,227,530 | 5/17 | Davis |
| 961,152 | 6/10 | Morse |
| 3,378,063 | 4/68 | Mefferd |
| 3,001,519 | 9/61 | Dietrich et al |
| 1,384,512 | 7/21 | Buchi |
| 1,266,429 | 5/18 | D'Orville |
| 2,528,081 | 10/50 | Rodnesky |

During the prosecution of our application for patent Ser. No. 596,951 of which this application is a continuation-in-part, the following patents were located in searches made by the Examiner and cited in Office Actions.

| U.S. PAT. NOS. | |
|---|---|
| 916,003 | Osborn |
| 3,699,938 | Frazier |
| 990,741 | Jacobs |
| 2,390,979 | Young |
| 3,354,872 | Gratzmuller |
| 3,118,496 | Vandenbosch |
| 2,231,525 | Breitling |

| FOREIGN PATENTS | | | |
|---|---|---|---|
| French | April 1939 | Quellet | 840,643 |
| Great Britain | Jan. 1925 | Tartrais | 212,902 |
| Austria | Nov. 1959 | Rassbohrer | 209,774 |

Many of the patents are directed to the heating of heavy oil (boiling points in range of from 230° to 330° C. — 446° to 626° F.) in order to soften the practically solid oil so that it can be used in diesel or other internal combustion engines. None of the other patents disclose or suggest the heating and/or maintaining of gasoline under pressure in a liquid state even though the temperature of the gasoline being heated is above the normal boiling point of gasoline at normal atmospheric pressures.

SUMMARY OF THE INVENTION

This invention relates to a device for superheating gasoline under pressure to temperatures well above the normal boiling point of gasoline at normal atmospheric pressures and for maintaining the gasoline in a heating chamber under sufficient pressure to keep the gasoline in said chamber in a liquid state, even though the temperature in said heating chamber is above the normal boiling point of the gasoline at normal atmospheric pressure.

It is true that existing art has dealt with the idea of heating a given volume of gasoline at ambient temperature to expand it to a larger volume and thus increase the gasoline mileage of the engine. While this invention also relates to heating gasoline, the devices of this invention, unlike any prior art in the field, are designed and positioned on the automobile engine so as to permit superheating the gasoline uniformly to a temperature above its boiling point at atmospheric pressure while retaining it in a liquid state under pressure developed by the fuel pump.

The embodiment illustrating the invention consists of a heating coil submerged in a gasoline chamber of cylindrical design. Gasoline enters the chamber and flows up through a superheating coil. The coil has baffle plates located at specific positions with each baffle plate placed at approximately a 3° angle to the top and bottom of the chamber, one above the other on opposite sides of the coil. This arrangement tends to agitate the gasoline and hold it against the sides of the coil as it flows upward in the chamber through the coil. It slows the flow of the gasoline through the chamber thus increasing contact between the gasoline and coil to superheat the gasoline. The superheater coil is heated with the engine cooling liquid flowing through it. The flow of cooling liquid is controlled by a calibrated orifice inserted in the cooling liquid (coolant) line designed to regulate the flow of the hot coolant to achieve the desired temperature of the fuel depending upon the speed of the engine.

The pressure on the Gasoline Superheater is developed chiefly by the action of the engine fuel pump. The expansion of the gasoline in the chamber because of the heat aids in increasing the pressure. However the pressure is controlled at the desired level by means of a calibrated orifice located either at or near the outlet of the housing in a recycle line, which line returns excess superheated gasoline unused by the engine through an air cooled fuel cooler or condenser and discharges it back into the fuel tank at or near ambient temperature. The discharged fuel flows through a tube extending into the fuel tank and ending near the bottom of the tank. The recycled fuel is injected into the bottom of the tank and allows mixing of the recycle fuel with fuel already in the tank thus turning the supply tank into a heat sink to allow dissipation of any latent heat. The gasoline that is supplied to the carburetor from the Superheater chamber, preferably, may be fed by means of a dip tube extending downward into the center of the heating coil to a level slightly below the level of the top baffle plate. The superheated liquid gasoline is conducted through this line from the superheater chamber to a commonly known fuel pressure regulator or a calibrated orifice where the pressure is reduced to the normal design working pressure for the carburetor. In some carburetors this will be a pressure of approximately 3.5 psig. This reduction in pressure prevents damage being done to the float valve assembly of the carburetor and further prevents over feeding or flooding of the carburetor with excess gasoline.

Connected to the engine as described below and shown on the drawings, the apparatus of this invention superheats the gasoline and allows the engine to be fed superheated liquid gasoline which (when the pressure holding it in its liquid state is removed as it enters the carburetor float bowl assembly) tends to boil or vaporize in the carburetor float bowl. This pure vapor exits by a system of vents existing in most automobile carburetors and is sucked into the carburetor venturi, through the carburetor and into the engine and burned. The remaining fuel in the carburetor float bowl assembly is drawn into the venturi of the carburetor and mixed with air through the normally known system of air mixing vents, ports, and jets. When this superheated fuel is subjected to the negative pressures inside the carburetor and the 15 inch or greater vacuum in the carburetor venturi and intake manifold, it tends to mix with the air move violently and vaporize more completely. It enters the engine combustion chamber as a more finely atomized fuel than in presently known automobile engines. This atomization is due to the violent changes from a positive pressure in the superheating chamber to a negative in the intake manifold. When these pressures over a liquid gasoline that is superheated (heated to a temperature above its normal boiling point and retained in a liquid state by pressure alone) are decreased, the superheated gasoline begins to boil violently within itself. This is analogous to the boiling of a liquid in a Bell Jar under vacuum. Our system allows a greater increase in operating efficiency and cleaner and more complete burning of gasoline in the engine. Because of the unique design and performance of the calibrated fuel superheater no changes are necessary to either the carburetor or the engine of any standard automobile and an increase in gasoline mileage is realized together with a decrease in unburned air pollutants.

DETAILED DESCRIPTION OF THE PREFERRED EMBODIMENT

Figure 1:
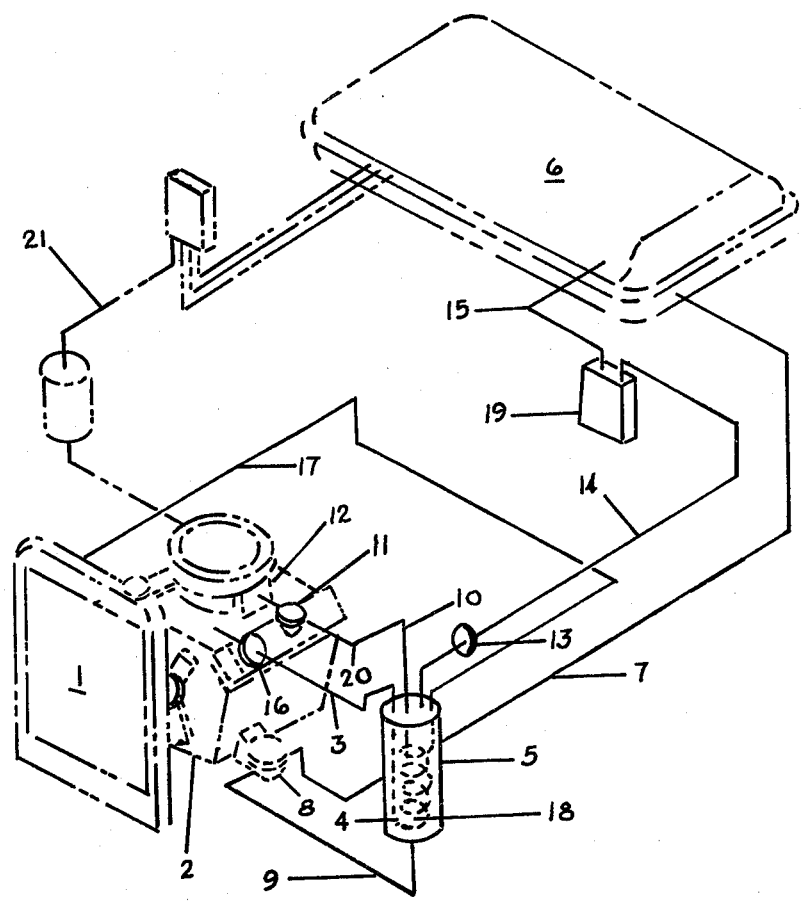
FIG. 1 is a partly diagrammatic view in perspective of an embodiment of the calibrated fuel superheater assembly of the present invention shown in the environment of a commonly known internal combustion engine, engine cooling system and fuel storage tank all of which are indicated with broken lines for illustrative purposes.

Referring now to the drawings and FIG. 1 in particular, a Calibrated Gasoline Superheater Chamber illustrating an embodiment of the present invention is designated by the numeral 5 and is shown located along the side of the engine 2 and behind the engine cooling radiator 1 and forward of the gasoline storage tank 6. Gasoline is drawn from the storage tank 6 through fuel line 7 by the pumping action of the fuel pump 8 and discharged through fuel line 9 under pressure into the bottom of the superheating chamber 5, said chamber being maintained full of liquid gasoline at all times by the action of said fuel pump 8. The gasoline superheater chamber 5 is heated by means of the hot liquid coolant from the cooling system of engine 2 being pumped through line 3 which is in communication with the superheating coil 4 and exits coil 4 through line 17 which returns the hot liquid to the engine radiator 1. The flow of this hot liquid coolant through line 3 is controlled by a calibrated orifice 16 so designed to allow the proper flow of hot coolant to heat the gasoline in the chamber 5 to a temperature desired as, for example, to a temperature of approximately 140° F. This gasoline is heated well above its normal boiling point at atmospheric pressure, but remains in a liquid state in the superheater chamber 5 by being held under an appropriate pressure as for example, a pressure of approximately 7 psig developed by the fuel pump 8 and regulated by means of a calibrated orifice 13 which is located in recycle line 14. Calibrated orifice 13 is designed to allow excess unused fuel in the chamber to bleed back into the storage tank 6 through lines 14 and 15 and cooler 19. This allows continuous circulation of unused superheated fuel which loses its character as superheated after the pressure is removed from it when it passes through orifice 13. Continuous circulation is necessary to prevent excess pressure from developing in the chamber 5 when excessively hot liquid coolant enters the coil through orifice 16 when the engine is producing excessive heat from heavy loading for long periods. Orifice 13 regulates this excessive pressure buildup which would override the action of fuel pump 8 preventing more fuel from being pumped into chamber 5 and causing the superheated gasoline within the chamber 5 to boil. Recycle line 14 carries hot, unused gasoline into fuel cooler or condenser 19 out through fuel line 15 and returns it to storage tank 6 at or near ambient temperature. All excess vapors entering the storage tank 6 after passing through the fuel cooler condensor 19 and fuel line 15 that have not been condensed to liquid state by the action of the condenser or cooler 19 are vented from the tank 6 through a commonly known vent system 21 containing a vapor separator and charcoal vapor storage container to the engine 2. The superheated liquid gasoline used to operate the engine is conveyed from the superheater chamber 5 by means of a dip tube 10 which is centered in the top head of the chamber 5 and extends downward into the center area of the heating coil 4 to a level slightly below the level of the top baffle plate. The pressure of the system from the fuel pump 8 regulated by orifice 13 forces the superheated gasoline up through the dip tube 10 and connecting line 20 to a commonly known fuel pressure regulator 11 or calibrated orifice in communication with the inlet fuel connection of the carburetor 12. If the pressure in chamber 5 becomes too great, excess gasoline under pressure passes out through orifice 13 and recycle line 14 to the condenser 19. The fuel pressure regulator 11 (or calibrated orifice) reduces the pressure of the superheated gasoline to a lower level to keep from damaging the needle valve in the carburetor float bowl assembly prior to the superheated fuel entering into the carburetor 12.

Figure 2:
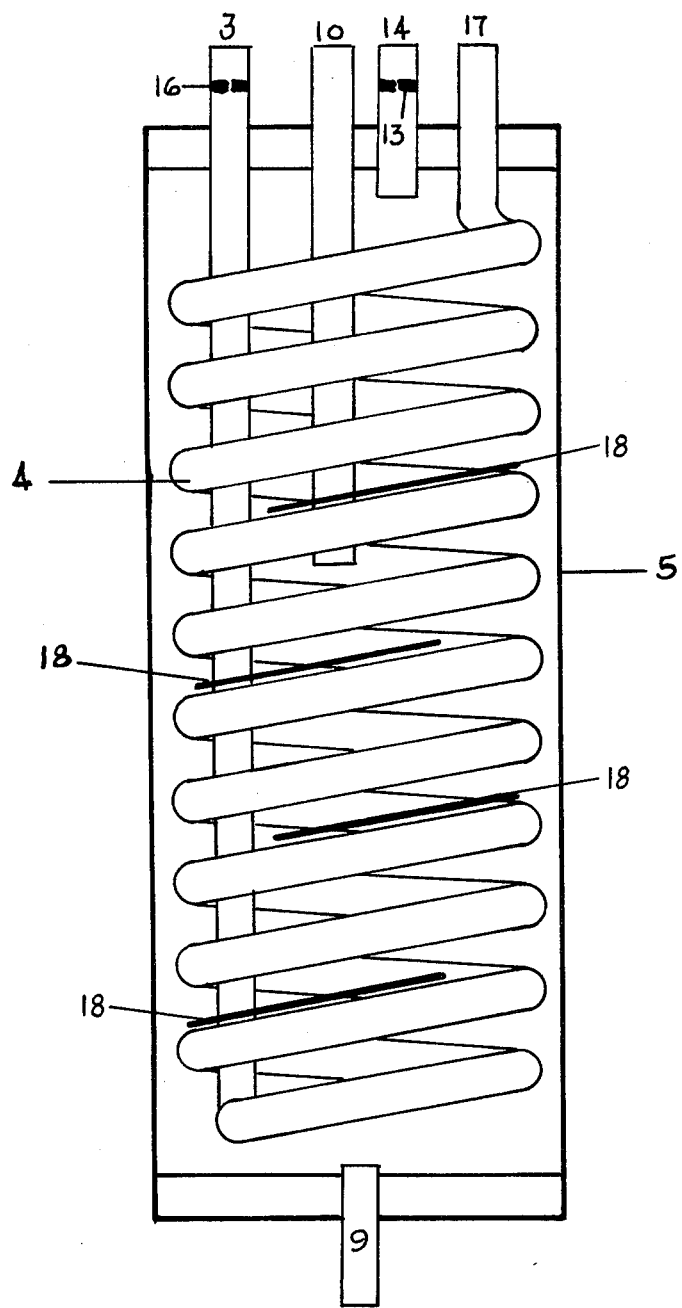
FIG. 2 is a side view of a calibrated gasoline superheater assembly embodying this invention drawn to a larger scale with the fore wall of the cylindrical chamber removed to show construction of the coil, the gasoline dip tube, the location and position of the baffle plates, the location of the heating coil, temperature control orifice, the location of the pressure control recycle orifice, and locations for hardware connections to communicate with the engine cooling and fuel systems.

Referring to FIG. 2, the inside of the superheater chamber 5 is shown in detail. The coil as designated by the numeral 4 is shown in its proper position inside the superheating chamber 5, but it is expanded in length for purposes of illustration to show the placement of the baffle plate 18 and dip tube 10. In actual use and construction each separate coil of the coil 4 directly contacts the coils next to it with the baffle plates 18 sandwiched between the separate coils in the positions indicated. The conduit where the hot liquid coolant from the engine enters the coil is illustrated by 3. Hot coolant flow entering the coil 4 is regulated by heating control orifice 16 and flows downward through line 3 through the coil and out of the coil through line 17 with the flow remaining at or near constant at all times. The inlet fuel line 9 enters the bottom of the chamber 5 and directs cold fuel flow up through the center of coil 4. As the flow of gasoline passes through coil 4 it comes in contact with the baffle plates. These plates are designated by numerals 18 and are designed to increase the time the gasoline remains in coil 4 and to divert the gasoline flow from side to side inside the coil 4 thus agitating the gasoline for better heating and preventing hot and cold spots in the coil heating area. The hot pressurized superheated gasoline then exits through dip tube 10 and is delivered through line 20 to the pressure regulator 11 and carburetor 12.

Another embodiment of this invention used for the purpose of experimentation replaces the calibrated orifices 16 and 13 with manually controlled flow and pressure control valves. It is recognized by the inventors that any type of flow control mechanism could be used to serve the function of the calibrated orifices 16 and 13 shown in the preferred embodiment including manual, automatic, mechanical, or electrically activated devices. In our experimentation, the published facts were taken into consideration.

Crude oil is a mixture of thousands of hydrocarbons with different boiling points. Distillation separates these hydrocarbons into narrow boiling range fractions which can be further processed into useful products. In the industry's early days crude oil was processed a little at a time in batch stills. In a modern distillation unit, the heated crude oil — a mixture of vapors and liquids — is discharged into a fractionating tower. The vapors rise through distillation trays set at various levels. At the same time part of the liquid condensate from the top of the tower — called reflux — is returned to the system and flows down over the trays establishing the proper conditions for fractional distillation. As the operation continues, different fractions of the crude oil condense on different trays, depending upon the temperatures at which they change from vapor to liquid. Heavier fractions with higher boiling points, condense on the lower (and hotter) trays; lighter fractions, with lower boiling points, on the higher (and cooler) trays. The unvaporized residue is drawn off at the bottom for further processing. In one representation of a distillation tower (American Petroleum Institute), the following fractions are shown as being collected at various points in order from the top to the bottom.

| At the top | at 215° F. and below | — Straight run gasoline |
|---|---|---|
| next — between | 235° F. and 385° F. | — Naphtha |
| next — between | 340° F. and 550° F. | — kerosene or light gas oil |
| next — between | 510° F. and 710° F. | — gas oil |
| next — | 10% at 560° F. and 85% at 700° F. | — heavy gas oil |
| | Straight run residue carried to vacuum distillation | |

We also bore in mind the following definition of the term "Gasoline" as defined in Condensed Chemical Dictionary, (Rheinhold):

"A mixture of volatile hydrocarbons suitable for the operation of an internal combustion engine — The major components are usually hydrocarbons with boiling points ranging from 60°-200° C. (i.e. 140° F. to 392° F.).

On the other hand heavy oils are defined (Condensed Chemical Dictionary, Rheinhold)

"Oils distilled from coal-tar between 230° and 330° C." (i.e., 446° and 626° F.)

By the use of the manually controlled flow and pressure controlled valves in place of the calibrated orifices 16 and 13 we have determined the efficiency of our Superheater at various temperatures and pressures and with various gasolines. We found that our Superheater was useful in increasing miles per gallon on the automobiles tested and in decreasing emissions of pollutants when the temperatures in the Superheater were maintained at any selected temperature from 100° to 225° F. (i.e., 60° to 200° C.) but that best results were obtained (depending, of course, on the composition of the actual gasoline being used) when such temperature was maintained at about 140° F. (i.e., 60° C.).

We have found that with our device the timing of the spark may be advanced beyond manufacturer's specification and thus greater mileage per gallon of gasoline obtained without the presently expected disadvantage of valve gear pinging.

We have tested the Superheater experimentally for over 39,500 miles on two different automobiles. One of these is a 1970 Ford Galaxie Sedan fully equipped and a 1972 Buick LeSabre Sedan also fully equipped. We found an average 72% increase in miles per gallon (MPG) mileage on the open highway at speeds of from 50 to 55 miles per hour (MPH). We found a 42°-46° increase in city suburban highway combination driving. We also ran dynamometer tests on the 1970 Ford using a 1 gallon jug of gasoline. Two different dynamometer tests so run gave an increase of about 100% in gasoline mileage. The testing machine was set at 10 Horsepower (HP) road load and run at 40 MPH. The result showed 26.4 MPG. Incidentally we found that Hydrocarbon (HC) and Carbon Monoxide (CO) emissions were reduced by 86% and 87% respectively.

Conservative figures show a 40% increase in mileage (MPG). We actually averaged about 70% increase in MPG on both the Ford and the Buick. Pollution has been reduced on the Ford by 87% on HC and 86% on CO. No such tests have been made on the Buick but our observation indicates pollution decrease at about the same percentages.

The temperatures may be controlled by the setting of the calibrated orifices 13 and 16 (or by manually controlled valves at those points) as we did in our experiments. Gasoline appears to be an azeotropic mixture of various low-boiling hydrocarbon components as illustrated above which begins boiling and vaporizing at a temperature lower than most, if not all, of the components. In our process, all temperatures above the boiling point of the azeotrope at about 100° F., depending on the various types of components of the gasoline being used, are useful. Thus, all temperatures in the range of from about 120° to 200° F. are useful. However, the higher the temperature the better is the efficiency inasmuch as the gasoline-air mixture is most valuable when upon release of the higher pressure every molecule of the gasoline mixture is turned into the gaseous state at the carburetor. Generally, therefore, we get more complete combustion, better mileage (MPG), and less pollution the higher the temperature is above 120° F., but we prefer (with the gasoline mixture which we used) to hold the temperature at about 140° F. (60° C.), inasmuch as danger of explosion of the gasoline in the Superheater increases as temperatures approach 200° F. Temperatures in the range of 120° to 225° F. are convenient with most automobile engines because the engines are designed to run with the engine coolant preferably at about 225° F. If higher temperatures are desired, they may be obtained by utilization of the exhaust of the engine. Air cooled engines may utilize either the exhaust or an electric heater for heating the contents of the Superheater chamber 5. If a greater pressure is needed to maintain the fuel liquid when raised to temperatures above 140° F., such pressure may be achieved by the use of a stronger fuel pump 8 than is normally used on present day conventional automobiles.

We have run, or had run, many tests to determine the miles per gallon of gas obtained by two automobiles; namely, a 1970 Ford Galaxie 500 sedan 351 V8, and a 1970 Buick LeSabre sedan 350 V8 both without the addition of the said calibrated gasoline superheater device and with the additon of said device. The tests showed that we have obtained an average of a 72% increase in miles per gallon of gasoline in tests run on the open highway at speeds of 50-55 MPH and have obtained an average of 42-46% increase in miles per gallon of gasoline in tests run in city-suburban combination highway driving.

We also performed, or had performed, tests on a dynamometer at 40 MPH with 10 HP load and obtained an increase in miles per gallon of gas of approximately 100%.

We also had fuel emission tests performed in connection with said dynamometer tests and found the following results:

| EMISSION CONTROL: TEST RESULTS ON CALIBRATED GASOLINE SUPERHEATER | | | | |
|---|---|---|---|---|
| RPM Engine Speed | Engine Temp | Superheater Temp | PPM H C | % CO |
| 680 | 195.F | 140.F | 200 | 0.4% |
| 1000 | 195.F | 140.F | 0 | 0.3% |
| 2800 | 195.F | 140.F | 10 | 0.4% |
| RESULTS WITHOUT THE USE OF INVENTION | | | | |
| 680 | 195.F | Unit by-pass | 300 | 7.5% |
| 2800 | 195.F | " | 80 | 3.0% |
| % IMPROVEMENT OF EMISSIONS | | | | |
| 680 | | | 33.0% | 94.0% |
| 2800 | | | 87.0% | 86.0% |

It is to be understood that the above described embodiments of our invention are for the purpose of illustration only and various changes may be made in the features and construction without departing from the scope of the following claims.

We claim:

1. In combination a gasoline superheating device and an internal combustion gasoline engine having a carburetor, said gasoline superheating device comprising a gasoline heating chamber, means for delivering gasoline to said heating chamber, means for heating the gasoline in said heating chamber to a temperature of approximately 140° F. which is above its normal boiling point of about 100° F. at normal atmospheric pressure, means for maintaining the gasoline in said heating chamber under sufficient pressure to keep said gasoline in said heating chamber in a liquid state, even though the temperature in said heating chamber is above the normal boiling point of the gasoline at normal atmospheric pressure, and means for delivering gasoline from said heating chamber to said carburetor.

2. In combination, a gasoline superheating device, and an internal combustion gasoline engine, said gasoline superheating device comprising a sealed heating chamber, said chamber containing means, comprising a coil, for superheating liquid gasoline contained in said heating chamber to a temperature of approximately 140° F. which is above its ambient pressure boiling point of about 100° F. at normal atmospheric pressure, and said chamber having an opening for the entry of pressurized gasoline fuel at an ambient temperature, an opening for the exit of superheated gasoline fuel and two openings for the entrance and exit of hot liquid coolant into, through, and out of said superheating coil, means for maintaining the gasoline in said heating chamber under sufficient pressure to keep said gasoline in said heating chamber in a liquid state, even though the temperature in said heating chamber is above the normal boiling point of the gasoline at normal atmospheric pressure, and means to supply heated liquid coolant to the coil through said two last named openings in said heating chamber.

3. The structure of claim 1, in which the engine has a liquid cooling system and the means for heating the gasoline in said heating chamber comprises a coil positioned in said heating chamber and in which means for delivering gasoline to said heating chamber comprises a conduit connected to a gasoline supply tank and to the bottom of said heating chamber, and the means for delivering gasoline from said heating chamber to said carburetor comprises a conduit connected to the top of said heater tank and in which a conduit from the engine's cooling system conducts hot liquid coolant to the top of said heating chamber and thence to one end of said coil, and a second conduit from the other end of said coil extends through the top of said heating chamber and conducts liquid coolant which has transferred some of its heat through said coil to gasoline in said heating chamber, back to said engine's cooling system.

4. The structure of claim 3 in which a plurality of baffles are provided within the heating chamber.

5. The structure of claim 1, in which the internal combustion gasoline engine is provided with a gasoline supply tank and in which the means for delivering gasoline to said heating chamber and the means for maintaining the gasoline in the heating chamber under sufficient pressure to keep the gasoline in a liquid state comprises a pump, conduits leading from said gasoline supply tank through said pump to said heating chamber, connections leading from said heating chamber to the carburetor, and a fuel pressure regulator in said last named conduits to allow the reduction of pressure on said gasoline prior to introduction into said carburetor.

6. The structure of claim 5, in which there is provided a conduit leading from said heating chamber to said gasoline supply tank and in which a calibrated recycle orifice is provided in said conduit to hold the gasoline in said heating chamber at a selected pressure higher than atmospheric but to allow the escape of gasoline under pressure higher than desired from said heating chamber back to the gasoline supply tank.

7. The structure of claim 2, in which the heating chamber is provided with a dip tube centrally located to extend down within the center of the coil, the internal combustion gasoline engine is provided with a carburetor and there is provided a conduit connected to the upper end of said tube and leading therefrom to said carburetor.

8. The structure of claim 7, in which there is provided in the conduit leading from the dip tube to the carburetor a fuel pressure regulator to allow the reduction of pressure on said gasoline prior to introduction into said carburetor.

9. The structure of claim 8, in which the heating chamber is provided with a plurality of baffle plates set and sandwiched between the separate turns of the coil so as to hold and agitate gasoline against the sides of the coil and promote more uniform superheating of the gasoline contained in the chamber.

10. The structure of claim 9, in which the lower end of the dip tube extends below the top baffle plate.

11. A gasoline superheating device for use with an internal combustion gasoline engine having a carburetor, said gasoline superheating device comprising
a gasoline heating chamber,
means for delivering gasoline to said heating chamber,
means for heating the gasoline in said heating chamber to a selected temperature in the range of from 100° to 225° F., which range is above the normal minimum boiling point of gasoline at about 100° F. at normal atmospheric pressure,
means for maintaining the gasoline in said heating chamber under sufficient pressure to keep said gasoline in said heating chamber in a liquid state, even though the temperature in said heating chamber is above the normal boiling point of the gasoline at normal atmospheric pressure, and
means for delivering gasoline from said heating chamber to the carburetor of an appropriate internal combustion engine.

12. In combination, a gasoline superheating device and an internal combustion gasoline engine having a carburetor, said gasoline superheating device comprising a gasoline heating chamber,
means for delivering gasoline to said heating chamber,
means for heating the gasoline in said heating chamber to a selected temperature in the range of from 100° to 225° F. which range is above the normal minimum boiling point of gasoline at 100° F. at normal atmospheric pressure,
means for maintaining the gasoline in said heating chamber under sufficient pressure to keep said gasoline in said heating chamber in a liquid state, even though the temperature in said heating chamber is above the normal boiling point of the gasoline at normal atmospheric pressure, and
means for delivering gasoline from said heating chamber to said carburetor.

13. A gasoline superheating device for use in connection with an internal combustion gasoline engine having a carburetor,
said gasoline superheating device comprising a gasoline heating chamber
means for delivering gasoline to said heating chamber,
means for heating the gasoline in said heating chamber to a temperature of approximately 140° F. which is above its normal boiling point of about 100° F. at normal atmospheric pressure,
means for maintaining the gasoline in said heating chamber under sufficient pressure to keep said gasoline in said heating chamber in a liquid state, even though the temperature in said heating chamber is above the normal boiling point of the gasoline at normal atmospheric pressure, and
means for delivering gasoline from said heating chamber to the carburetor of an appropriate internal combustion engine.

14. A gasoline superheating device for use with an internal combustion gasoline engine,
said gasoline superheating device comprising a sealed heating chamber,
said chamber containing means, comprising a coil, for superheating liquid gasoline contained in said heating chamber to a temperature of in the range of from 100° to 225° F., which range is above the normal minimum ambient pressure boiling point of about 100° F. at normal atmospheric pressure, and
said chamber having an opening for the entry of pressurized gasoline fuel at an ambient temperature,
an opening for the exit of superheated gasoline fuel and two openings for the entrance and exit of hot liquid coolant into, through, and out of said superheating coil,
means for maintaining the gasoline in said heating chamber under sufficient pressure to keep said gasoline in said heating chamber in a liquid state, even though the temperature in said heating chamber is above the normal boiling point of the gasoline at normal atmospheric pressure, and
means to supply heated liquid coolant to the coil through said two last named openings in said heating chamber.

15. In combination,
a gasoline superheating device, and
an internal combustion gasoline engine,
said gasoline superheating device comprising a sealed heating chamber,
said chamber containing means, comprising a coil, for superheating liquid gasoline contained in said heating chamber to a selected temperature in the range of from 100° to 225° F., which range is above its normal minimum ambient pressure boiling point of about 100° F. at normal atmospheric pressure, and
said chamber having an opening for the entry of pressurized gasoline fuel at an ambient temperature, an opening for the exit of superheated gasoline fuel and two openings for the entrance and exit of hot liquid coolant into, through, and out of the superheating coil,
means for maintaining the gasoline in said heating chamber under sufficient pressure to keep said gasoline in said heating chamber in a liquid state, even though the temperature in said heating chamber is above the normal boiling point of the gasoline at normal atmospheric pressure, and means to supply heated liquid coolant to the coil through said two last named openings in said heating chamber.

16. A gasoline superheating device for use in combination with an internal combustion gasoline engine, said gasoline superheating device comprising a sealed heating chamber, said chamber containing means, comprising a coil, for superheating liquid gasoline contained in said heating chamber to a temperature of approximately 140° F. which is above its ambient pressure boiling point of about 100° F. at normal atmospheric pressure, and said chamber having an opening for the entry of pressurized gasoline fuel at an ambient temperature, an opening for the exit of superheated gasoline fuel and two openings for the entrance and exit of hot liquid coolant into, through, and out of said superheating coil, means for maintaining the gasoline in said heating chamber under sufficient pressure to keep said gasoline in said heating chamber in a liquid state, even though the temperature in said heating chamber is above the normal boiling point of the gasoline at normal atmospheric pressure, and means to supply heated liquid coolant to the coil through said two last named openings in said heating chamber.

* * * * *